W. McLENDON.
Cotton Gin.
No. 26,604.
Patented Dec. 27, 1859.
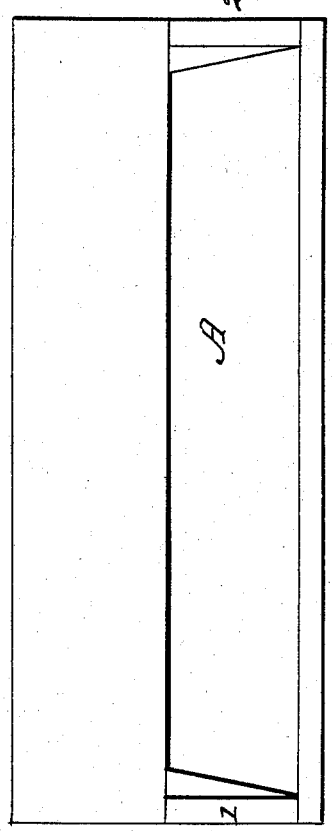
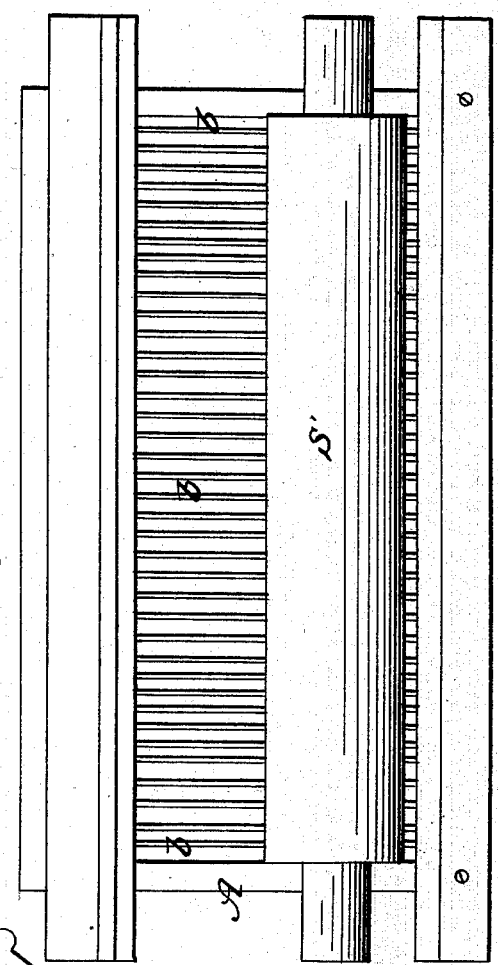
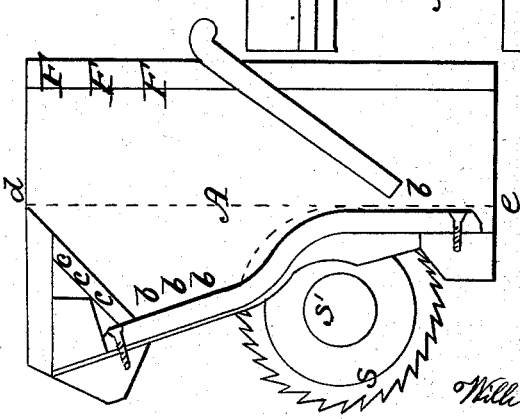

UNITED STATES PATENT OFFICE.

W. McLENDON, OF GREENVILLE, GEORGIA.

IMPROVEMENT IN COTTON-GINS.

Specification forming part of Letters Patent No. 26,604, dated December 27, 1859.

*To all whom it may concern:*

Be it known that I, WILLIAM MCLENDON, of the county of Meriwether and State of Georgia, have invented a new and useful Improvement in Cotton-Gins; and I do hereby declare that the following is a full, clear, and exact description of the same, reference being had to the annexed drawings, forming part of this specification, in the several figures of which similar characters of reference denote the same parts.

Figure 1 is a vertical section perpendicular to the axis of the saws. Fig. 2 is a top view showing the end of the beveled roll-box. Fig. 3 is a front view of the gin.

This improvement has reference to the roll-box of cotton-gins; and its nature consists in beveling the ends of the roll-box, so that the cotton will expand on the outside, and thus cause the saw to pass through it at different points every turn.

In the drawings, A represents the roll-box; b, the ribs; S, the saw; S', the shaft of the saws, and d e a line showing from where the beveling of the roll-box commences. Let the ends of roll-box A be of the same thickness as far back as the line d e, and then beveled, as represented by the figures 1 and 2 in Fig. 2, until at an edge at the back of the roll-box. (Represented by the letter F.) It is intended that these ends A should cover the outer ribs, so that the first saw will pass so near them as to prevent, when in operation, the clogging with seed. The effect of this beveling of the heads of the roll-box is to make it at the outer side from the saw wider than at the saw, so that the roll of cotton will expand on the outside, causing the saw to pass through it at a different place each turn, which will make more lint, and it will not be so much cut to pieces as in the usual gins, and there being no space between the outer saws and the ends of the roll-box, the gin will not be liable to choke with seed.

I claim—

Beveling the ends of the roll-box from the saws, substantially as and for the purposes set forth.

WILLIAM McLENDON.

Attest:
JOHN J. HUSSEY,
BENJAMIN POWELL.